United States Patent
Kostjunin et al.

[11] 3,913,613
[45] Oct. 21, 1975

[54] SAFETY VALVE

[76] Inventors: Boris Nikolaevich Kostjunin, Teply Stan, 1 mikroraion, korpus 7, kv. 398; Alfred Fedorovich Zadvorny, prospekt Vernadskogo, 91, korpus 2, kv. 105, both of Moscow; Arnold Mikhailovich Ragutsky, ulitsa Fedorova, 4, kv. 47, poselok Malakhovka, Moskovskoi oblasti; Vladimir Viktorovich Starichnev, Novolesnaya ulitsa, 18, korpus 1, kv. 128, Moscow, all of U.S.S.R.

[22] Filed: Oct. 25, 1974

[21] Appl. No.: 517,937

[52] U.S. Cl. ............................ 137/494; 137/529
[51] Int. Cl. .................................. F16k 31/169
[58] Field of Search .......... 137/494, 375, 469, 472, 137/511, 528, 535, 540, 529

[56] References Cited
UNITED STATES PATENTS

| | | | |
|---|---|---|---|
| 867,619 | 10/1907 | Strnad | 137/494 |
| 3,107,688 | 10/1963 | Caslow | 137/494 |
| 3,123,093 | 3/1964 | Akerman et al. | 137/494 |
| 3,626,975 | 12/1971 | Bobst | 137/494 |

Primary Examiner—Martin P. Schwadron
Assistant Examiner—Robert J. Miller
Attorney, Agent, or Firm—Lackenbach, Lilling & Siegel

[57] ABSTRACT

The invention provides a safety valve designed primarily for hydraulic pit props.

According to the invention, the safety valve comprises a valve body with outlet passages and a central bore, the latter accommodating a valve seat constructed in the form of a cup with an extended bottom. Fitted inside the valve seat and coaxially therewith is a throttle having a hole formed centrally therein and arranged to communicate with the valve inlet chamber. A ring with radial holes formed therein and a sealing ring are movably mounted on the external side surface of the valve seat. A union is screwed into the valve body so as to clamp down the valve seat. Said union has a central bore which accommodates a membrane arranged to rest on the faces of said valve seat and throttle. Also accommodated in the union bore are a spring-loaded sealing member seated on the membrane and a charging valve fitted in the top end of the union. The space bounded by the charging valve, the interior walls of the union and the sealing member forms a gas chamber filled with an inert gas under pressure. The gas pressure acts onto the membrane through the sealing member. A central hole and peripheral holes communicating with the valve inlet chamber are provided in the end of the valve body.

4 Claims, 6 Drawing Figures

SAFETY VALVE

BACKGROUND AND SUMMARY OF THE INVENTION

The present invention relates to mining engineering and has particular reference to safety valves of hydraulic pit props employing water-oil emulsion with a viscosity of $°E_{20} \leq 2$.

Known in the art has body which accommodates a seat and a throttle and has an inlet chamber formed at one end. The seat is embraced by a stationary ring. A membrane is arranged to rest on the end faces of the ring, seat and throttle. A union is screwed into the valve body for fixing the seat in the valve body through the stationary ring. Fitted in the top end of the union is a charging valve provided with a seal. The interior of the union forms a gas chamber and accommodates a sealing cup. The pressure of the gas contained in said chamber forces said cup to hold the membrane against the faces of the ring, seat and throttle.

The pressure fluid flows from the inlet chamber into the throttle and thence, via a circular passage between the seat and throttle, to the membrane. The fluid pressure unseats the membrane and the fluid flows through a circular passage between the ring and the seat and leaves the valve.

The safety valve under consideration suffers from the disadvantage that pressure rises sharply when the working fluid passes through the valve. Another disadvantage is low rate of flow through the valve owing to small circular passages on the inlet and outlet sides. These disadvantages may defeat the purpose of the valve, the hydraulic prop involved becoming damaged.

One more disadvantage is that the pressure fluid may get into the gas chamber, whereby the operating pressure of the safety valve will be raised sharply.

It is an object of the present invention to provide a safety valve having a high rate of flow at small pressure increments.

It is a further object of the invention to provide a safety valve which, when closing after operation, will produce a small pressure differential.

These objects are achieved in a safety valve comprising a ring having radial holes and arranged to embrace a part of the external side surface of the valve seat. The ring is adapted to be moved along the side surface of the seat by the action of a sealing ring arranged to embrace the remaining part of the external side surface of the valve seat and actuated by the inlet pressure of the pressure fluid.

It is desirable that in order to provide an effectively sealed-off gas chamber use be made of sealing member in the form of a hollow rubber cylinder with a hole provided in the cylinder end remote from the membrane for the purpose of accommodating a charging valve constructed in the form of a cylinder having a shoulder adapted to close said hole. It is also desirable that the hollow rubber cylinder be charged with an inert gas under pressure and a spring be fitted inside said rubber cylinder, one end of said spring bearing against the charging valve and the other end being located by a projection provided on the interior side of the rubber cylinder and adjacent to the membrane.

For the safety valve to produce a small pressure differential when closing after operation, it is desirable that the area of the ring side facing toward the membrane be larger than the ring side facing toward the inlet chamber of the valve.

The valve arrangement employing a ring adapted to move along the external side surface of the valve seat provides for increasing the flow area of the valve outlet passages when pressure build-up occurs in the system protected by the safety valve.

When the pressure in the system being protected rises within 25 percent, the rate of flow through the safety valve which constitutes the present invention reaches 80 l/min, which is at least eight times the maximum rate of flow through the safety valves known in the art.

This safety valve is designed for long service in hydraulic pit props. It can open to the maximum rate of flow a great many times without any need for repairs or replacement of the parts.

The difference in the area between the opposite sides of the ring enables the safety valve to produce a low pressure differential when closing after operation. The use of a hollow rubber cylinder with a hole to accommodate a charging valve provides an effectively sealed-off gas chamber wherein the required gas pressure is maintained for a long period.

BRIEF DESCRIPTION OF THE DRAWINGS

Now the invention will be described in detail with reference to the accompanying drawings in which.

DESCRIPTION OF THE PREFERRED EMBODIMENTS

Figure 1:
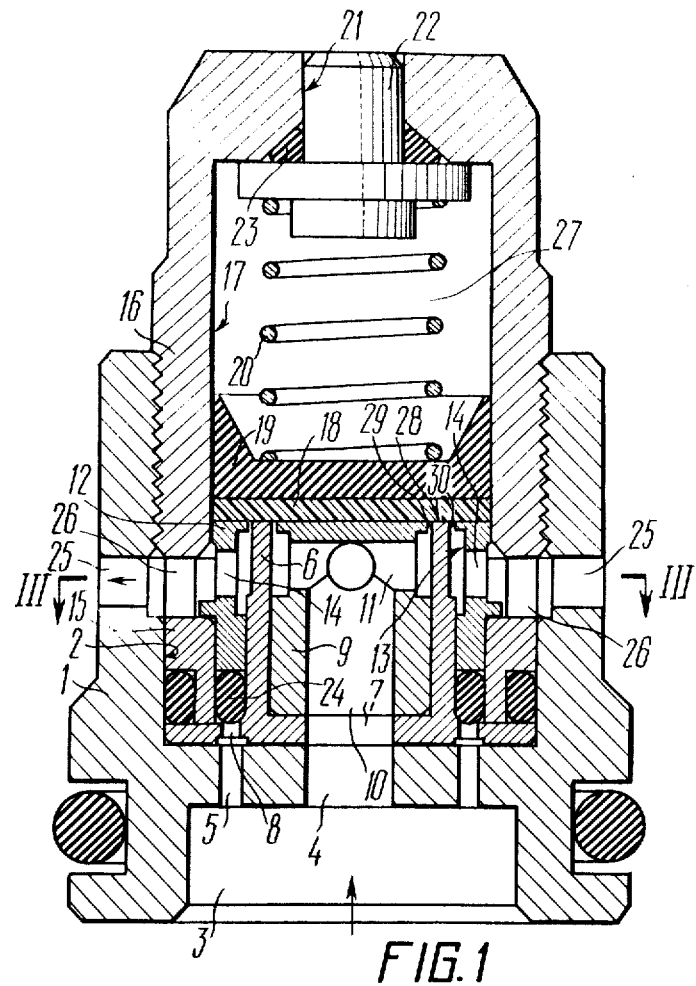
FIG. 1 shows the safety valve in a closed position (longitudinal sectional view).
Figure 2:
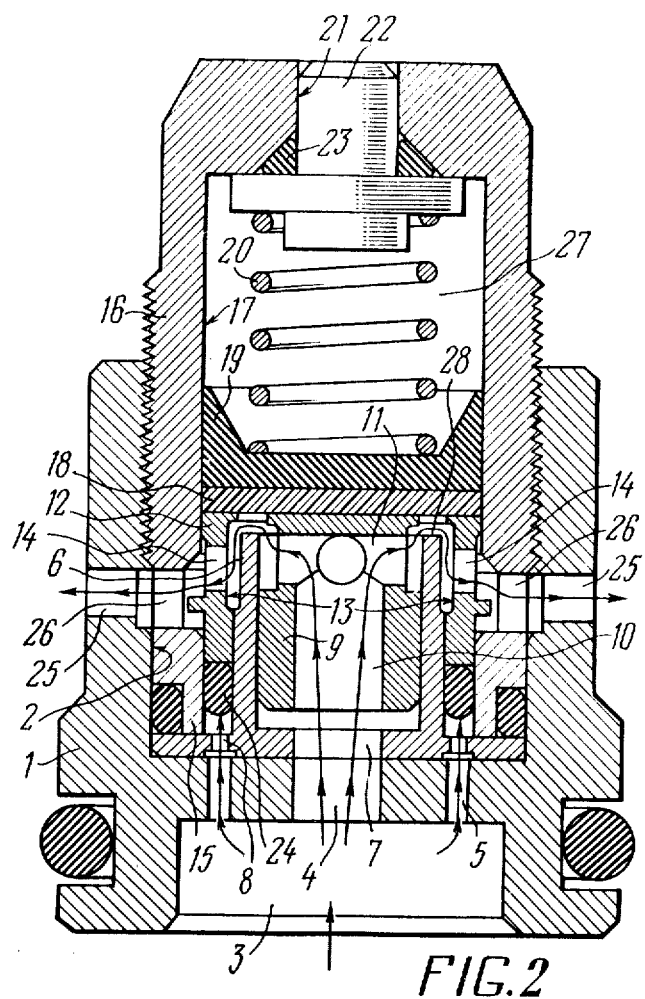
FIG. 2 shows the safety valve in an open position during operation.

According to the invention, the safety valve, as best shown in FIGS. 1 and 2, comprises a metal body 1 with an axial cavity formed by a bore 2. Formed in one end of the body 1 are an inlet chamber 3, a central hole 4 and two peripheral holes 5. The bore 2 of the body 1 accommodates a metal valve seat 6 which is constructed in the form of a cup with an extended bottom wherein are provided a central hole 7 and two peripheral holes 8. The central hole 7 is located coaxially with the central hole 4 in the body 1, whereas the peripheral holes 8 are coaxial with the peripheral holes 5 in the body 1. Located inside valve seat 6 coaxially therewith is a metal throttle 9 having a central hole 10 which communicates with the inlet chamber 3 through the central holes 4 and 7.

Formed in the side wall of the throttle 9 are radial holes 11 connecting with the central hole 10 in the throttle 9.

Part of the external side surface of the valve seat 6 is embraced by a ring 12 which has a bore 13 in its upper portion and is provided with radial outlet holes 14. The ring 12 rests on a metal sleeve 15 and is adapted to move along the side surface of the vlave seat 6. A metal union 16 screwed all the way into the bore 2 of the body 1 clamps the seat 6 to the shoulder of the body 1 through the sleeve 15. An axial cavity formed in the union 16 by its bore 17 accommodates a plastic membrane 18. The membrane 18 rests on the side faces of the ring 12, valve seat 6 and throttle 9 and is loaded on the top by a spring 20 through a rubber sealing member 19. The top of the union 16 is provided with a hole 21 which accommodates a metal charging vlave 22 with a rubber seal 23.

The pressure fluid passes through the peripheral holes 5 and 8 in the body 1 to a rubber sealing ring 24 which embraces the remaining part of the external otuer surface of the valve seat 6.

The body 1 has side outlet passages 25 which communicate with the radial outlet holes 14 in the ring 12 through outlet passages 26 provided in the side wall of the union 16.

The portion of the bore 17 in the union 16 bounded by the charging valve 22 and the sealing member 19 forms a gas chamber 27 designed to be filled with an inert gas at a high pressure. The gas pressure, acting through the sealing member 19, forces the membrane 18 against the face 28 of the valve seat 6, whereby the inlet chamber 3 is disconnected from the outlet passages and the inlet circular passage 29 is separated from the outlet circular passage 30.

Figure 3:
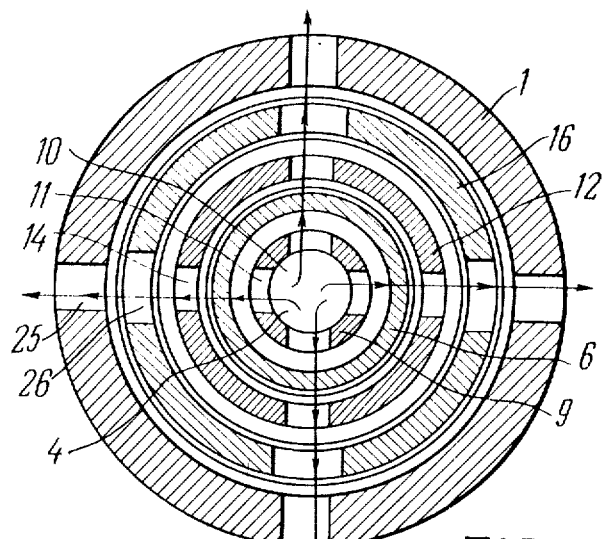
FIG. 3 is a sectional view taken along the line III—III of FIG. 1.

The operation of the safety valve is described below with reference to the accompanying drawings. It will be noted that FIGS. 2, 3 show the valve in the working position, the path of the fluid being indicated by arrows.

From the inlet chamber 3 (FIG. 2) the pressure fluid flows through the holes 5, 7, 10, 11 (FIGS. 2 and 3) and the circular passage 29 (FIG. 2) to the bottom side of the membrane 18 and the fluid pressure lifts the membrane 18 off the face 29 of the valve seat 6. At the same time the working fluid passes from the inlet chamber 3 through the peripheral holes 5 and 8 to the sealing ring 24 and causes said sealing ring and also the ring 12 to move upward on the external side surface of the valve seat 6, whereby the membrane 18 is also moved upward. As a ring 12 moves upward, a large outlet opening is formed. Now, instead of flowing through the small circular passage 30, the pressure fluid goes via the large bore 13 in the ring 12 to the outlet passages 25 and 26. The flow area of the bore 13 is a few times larger than the flow area of the circular passage 30. After the fluid pressure in the inlet chamber 3 falls below the gas pressure in the gas chamber 27, the sealing member 19 is caused to move back, whereby the membrane 18 and the ring 12 are returned into the initial position and the membrane 18 is seated onto the face 28 of the valve seat 6. Now the inlet chamber 3 is disconnected from the outlet system.

Figure 4:
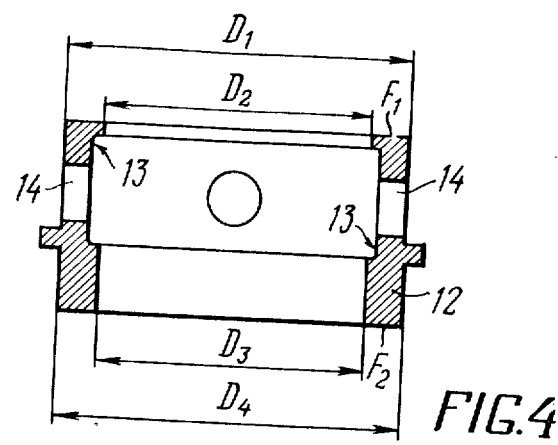
FIG. 4 shows the construction of the ring with radial holes.

To facilitate the return of the ring 12 into the initial position shown in FIG. 1, the area $F_1$ (FIG. 4) of the ring 12 facing toward the membrane 18 (FIG. 2) is larger than the area $F_2$ (FIG. 4) facing toward the inlet chamber 3 (FIG. 2), i.e. $F_1 > F_2$ where $F_1 = J_1/4 \ (D_1^2 - D_2^2)$;

$F_2 = J_1/4 \ (D_4^2 - D_3^2)$;

where $D_1$ and $D_2$ are the inside and outside diameters of the ring 12 on the side facing toward the membrane 18;

$D_3$ and $D_4$ are the inside and outside diameters of the ring 12 on the side facing toward the inlet chamber 3.

Figure 5:
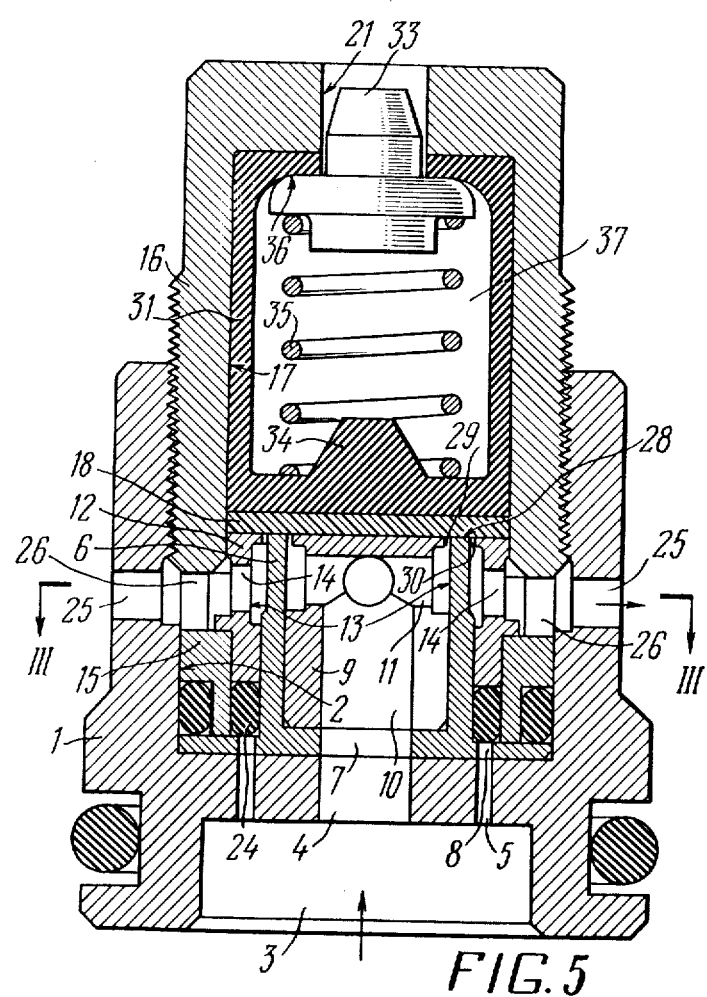
FIG. 5 shows the construction of an alternate or modified safety valve employing a hollow rubber cylinder (longitudinal sectional view)
Figure 6:
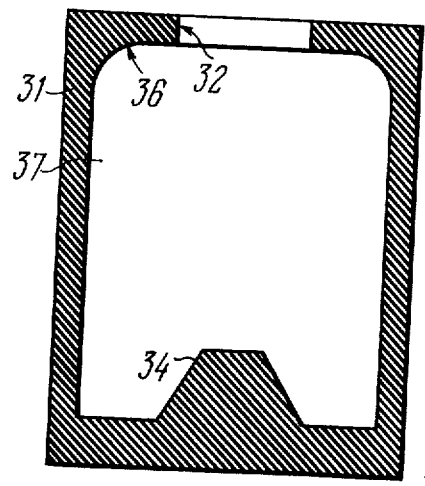
FIG. 6 shows a sectional view of the hollow rubber cylinder.

To provide an effectively sealed-off gas chamber, the sealing member may be constructed in the form of a hollow rubber or other suitable elastomeric cylinder 31 (FIGS. 5 and 6) having a hole 32 to accommodate a charging valve 33. In this embodiment of the invention the rubber cylinder 31 is located in the bore 17 of the union 16 so that the cylinder hole 31 coincides with the hole 21 in the union 16. Fitted inside the rubber cylinder 31 is a spring 35. One end of the spring 35 is located by a projection 34 provided on the interior side of the rubber cylinder and adjacent to the membrane 18. The other end of the spring 35 forces the shoulder of a charging valve 33 against the inner face 36 of the rubber cylinder 31. The interior of the rubber cylinder 31 bounded by the charging valve 33 forms a gas chamber 37 designed to be charged with an inert gas under pressure. The pressure of the inert gas contained in the gas chamber 37 forces the shoulder of the charging valve 33 against the inner face 36 of the rubber cylinder 31, providing an effective seal.

The safety valve embodiment employing the rubber cylinder 31 operates in the same manner as the embodiment employing the sealing member 19 (FIGS. 1 and 2).

The construction of the safety valve employing the ring 12 adapted to move along the external side surface of the valve seat 6 provides for increase of the outlet flow area at a pressure build-up in the system being protected. This arrangement sharply increases the rate of flow through the safety valve at small increments of the flow pressure.

The arrangement wherein the side of the ring 12 facing toward the membrane 18 has a larger area than the ring side facing toward the inlet chamber 3 enables the safety valve to produce a low pressure differential when closing after operation.

The employment of the hollow rubber cylinder 31 (FIGS. 5 and 6) with the hole 32 accommodating the charging valve 33 provides an effectively sealed-off gas chamber capable of retaining the required gas pressure for a long period and thus extending the service life of the safety valve.

What is claimed is:

1. A safety valve comprising: a valve body with an axial cavity, said valve body having an inlet chamber, a central hole and peripheral holes formed at one end thereof; a valve seat, having a face, located in said axial cavity and having a central hole and peripheral holes disposed coaxially with said central and peripheral holes formed in said valve body; a throttle, having a face, located in said valve seat and communicating with said inlet chamber through a central hole provided in said throttle and through the central hole in said valve seat; a ring, having a face, and having radial holes and arranged about a part of the external side surface of said valve seat, said ring being adapted to move along the side surface of the valve seat; outlet passages formed in the side wall of said valve body and arranged to communicate with the radial holes in said ring; a sealing ring arranged about the remaining part of the external side surface of said valve seat and adapted to be moved along the side surface of said valve seat by the pressure of the pressure fluid passing from the inlet chamber through said peripheral holes; a union having an axial cavity and fixedly mounted inside said valve body, and being arranged to fit against the base of said valve seat, said union having outlet passages formed in the side wall thereof communicating with said outlet passages in said valve body; a membrane located inside said union and arranged to be held against the face of said throttle, valve seat and ring, said membrane being adapted to be moved axially inside the union by the pressure of a working fluid; a sealing member located inside said union and seated on said membrane; a charging valve provided with a seal and accommodated inside said union at the end thereof opposite to said sealing member; a gas chamber formed by the union interior bounded by said sealing member and charging valve, and said gas chamber containing gas under pressure.

2. A safety valve comprising: a valve body with an axial cavity, said valve body having an inlet chamber, a central hole and peripheral holes formed at one end thereof; a valve seat, having a face, located in said axial cavity and having a central hole and peripheral holes; a throttle, having a face, located in said valve seat and communicating with said inlet chamber through a central hole provided in said throttle and through the hole in said valve seat; ring, having a face, and having radial holes and arranged about a part of the external side surface of said valve seat, said ring being adapted to move along the side surface of said valve seat; outlet passages formed in the side wall of said valve body and arranged to communicate with the radial holes in said ring; a sealing ring arranged about the remaining part of the external side surface of said valve seat and adapted to be moved along the side surface of said valve seat by the pressure of the pressure fluid passing from the inlet chamber through said peripheral holes; a union having an axial cavity and fixedly mounted inside said valve body, being arranged to fit against the base of said valve seat, said union having outlet passages formed in the side wall thereof communicating with said outlet passages in said valve body; a membrance located inside said union and arranged to be held against the faces of said throttle, valve seat and ring, said membrane being adapted to be moved axially inside the union by the pressure of a working fluid; a sealing member in the form of a hollow rubber cylinder located inside said union, the rubber cylinder having a hole in one of the ends and a projection on the internal side of the opposite end adjacent to the membrane; a charging valve accommodated in the hole in said rubber cylinder and constructed in the form of a shouldered cylinder, the diameter of the charging valve shoulder exceeding the diameter of said hole in the rubber cylinder, said shoulder being located inside the rubber cylinder and adapted to close said hole; a spring located inside the rubber cylinder, one end of said spring being fitted over said projection and the other end resting against said charging valve, which spring applies initial pressure to hold the shoulder of the charging valve against the internal face of the rubber cylinder; a gas chamber formed by the interior of the rubber cylinder bounded by the charging valve, and said gas chamber containing gas under pressure.

3. A safety valve as claimed in claim 1, in which the side of said ring facing toward said membrane has a larger area than the ring side facing toward said inlet chamber.

4. A safety valve as claimed in claim 2, in which the side of said ring facing toward said membrane has a larger area than the ring side facing toward said inlet chamber.

* * * * *